United States Patent
Yang et al.

(10) Patent No.: US 12,468,356 B2
(45) Date of Patent: Nov. 11, 2025

(54) LAPTOP COMPUTER WITH DETACHABLE TOUCHPAD MODULE

(71) Applicant: Acer Incorporated, New Taipei (TW)

(72) Inventors: Yi-Hsuan Yang, New Taipei (TW);
Cheng-Mao Chang, New Taipei (TW);
Pao-Min Huang, New Taipei (TW);
Chi-Hung Lai, New Taipei (TW)

(73) Assignee: Acer Incorporated, New Taipei (TW)

( * ) Notice: Subject to any disclaimer, the term of this patent is extended or adjusted under 35 U.S.C. 154(b) by 182 days.

(21) Appl. No.: 18/404,864

(22) Filed: Jan. 4, 2024

(65) Prior Publication Data

US 2024/0402765 A1  Dec. 5, 2024

(30) Foreign Application Priority Data

Jun. 2, 2023  (TW) ................................ 112205642

(51) Int. Cl.
*G06F 1/16* (2006.01)

(52) U.S. Cl.
CPC .................................. *G06F 1/169* (2013.01)

(58) Field of Classification Search
CPC ...... G06F 1/1632; G06F 1/169; G06F 1/1669; G06F 3/03547
See application file for complete search history.

(56) References Cited

U.S. PATENT DOCUMENTS

| | | | | |
|---|---|---|---|---|
| 4,870,604 A | * | 9/1989 | Tatsuno | G07F 7/1008 |
| | | | | 361/679.55 |
| 5,400,213 A | * | 3/1995 | Honda | G06F 1/1669 |
| | | | | 361/679.08 |
| 5,490,036 A | * | 2/1996 | Lin | G06F 1/1616 |
| | | | | 361/679.55 |
| 5,510,953 A | * | 4/1996 | Merkel | G06F 3/0202 |
| | | | | 361/679.08 |
| 5,966,284 A | * | 10/1999 | Youn | G06F 1/1669 |
| | | | | 361/679.17 |
| 6,320,743 B1 | * | 11/2001 | Jin | G06F 1/1656 |
| | | | | 361/679.08 |
| 6,731,269 B2 | * | 5/2004 | Horiuchi | G06F 1/1662 |
| | | | | 361/679.17 |
| 6,842,332 B1 | * | 1/2005 | Rubenson | G06F 1/1656 |
| | | | | 400/82 |
| 9,651,993 B2 | * | 5/2017 | Huang | G06F 3/0202 |
| 10,643,806 B1 | * | 5/2020 | Huang | G06F 1/169 |
| 11,650,680 B2 | * | 5/2023 | Huang | G06F 1/169 |
| | | | | 345/173 |
| 2008/0270665 A1 | * | 10/2008 | Senatori | G06F 1/169 |
| | | | | 345/173 |

(Continued)

*Primary Examiner* — Adrian S Wilson
(74) *Attorney, Agent, or Firm* — JCIPRNET

(57) ABSTRACT

A laptop computer with a detachable touchpad module includes a housing, a locking hook, and a touchpad module. The housing has a first surface and a second surface opposite to each other. The first surface is an external surface of the housing, and the second surface is an internal surface of the housing. The locking hook is freely pivoted to the housing and located at the second surface. The touchpad module has a locking hole. When the touchpad module is assembled to the first surface, the locking hole penetrates the housing and is protruded out of the second surface, and the locking hook is locked with the locking hole.

10 Claims, 9 Drawing Sheets

(56) References Cited

U.S. PATENT DOCUMENTS

| | | | |
|---|---|---|---|
| 2010/0145892 A1* | 6/2010 | Yang | G06F 16/683 |
| | | | 707/E17.101 |
| 2012/0314347 A1* | 12/2012 | Zhang | G06F 1/169 |
| | | | 361/679.1 |
| 2014/0111914 A1* | 4/2014 | Leggett | H01H 11/00 |
| | | | 361/679.1 |
| 2016/0062411 A1* | 3/2016 | Morrison | G06F 1/1632 |
| | | | 361/679.08 |
| 2022/0197413 A1* | 6/2022 | Huang | G06F 3/03547 |
| 2023/0026242 A1* | 1/2023 | Chang | G06F 1/1654 |

\* cited by examiner

LAPTOP COMPUTER WITH DETACHABLE TOUCHPAD MODULE

CROSS-REFERENCE TO RELATED APPLICATION

This application claims the priority benefit of Taiwan application serial no. 112205642, filed on Jun. 2, 2023. The entirety of the above-mentioned patent application is hereby incorporated by reference herein and made a part of this specification.

BACKGROUND

Technical Field

The disclosure relates to a laptop computer, in particular to a laptop computer with a detachable touchpad module.

Description of Related Art

Due to limitations of component arrangement and fixed-structure manufacturing, current laptop computers are not easy to maintain, which may lower the component replacement rate and the effectiveness in repairing. As a result, the user usually has no choice but to buy new computers after the components are damaged.

For a repairman, the component arrangement and fixed-structure manufacturing may make it difficult to instantly remove some components from the housing as they are limited by the assembly. For instance, in the process of assembling products, a touchpad module is assembled to the internal surface of the housing from inside to outside, and a touchpad is exposed via the opening of the housing. The touchpad module is fixed inside the housing by screws or melting, and after the touchpad module is assembled, other components (e.g. a circuit board, a battery, a fan, etc.) need to be assembled into the housing in order.

As a result, when the touchpad module is damaged and needs to be replaced, the repairman is required to remove the other components first in order to check and remove the touchpad module, which increases the difficulty and complication of repairing the touchpad module.

SUMMARY

The disclosure provides a laptop computer with a detachable touchpad module, which makes it easy and convenient to assemble and remove the touchpad module of the laptop computer.

A laptop computer with a detachable touchpad module according to an embodiment of the disclosure includes a housing, a locking hook, and a touchpad module. The housing has a first surface and a second surface opposite to each other. The first surface is an external surface of the housing, and the second surface is an internal surface of the housing. The locking hook is freely pivoted to the housing and located at the second surface. The touchpad module has a locking hole. The touchpad module is assembled to the first surface, the locking hole penetrates the housing and is protruded out of the second surface, and the locking hook is locked with the locking hole.

Based on the above, the housing of the laptop computer has the first surface and the second surface opposite to each other. The first surface is the external surface of the housing, and the second surface is the internal surface of the housing. Moreover, the touchpad module is assembled to the first surface of the housing in a detachable manner. The touchpad module has the locking hole. The locking hole penetrates the housing and is protruded out of the second surface when the touchpad module is assembled to the first surface, so that the locking hole is locked and fixed together with the locking hook arranged at the second surface.

As a result, the user is allowed to remove the touchpad module from the first surface easily and conveniently and is not required to take apart the inner components of the housing first as described above. In other words, the touchpad module of the laptop computer is solely removable as the above configuration effectively lifts the restrictions on the relationship of connection and assembly between the touchpad module and the other components.

DESCRIPTION OF THE EMBODIMENTS

Figure 1:
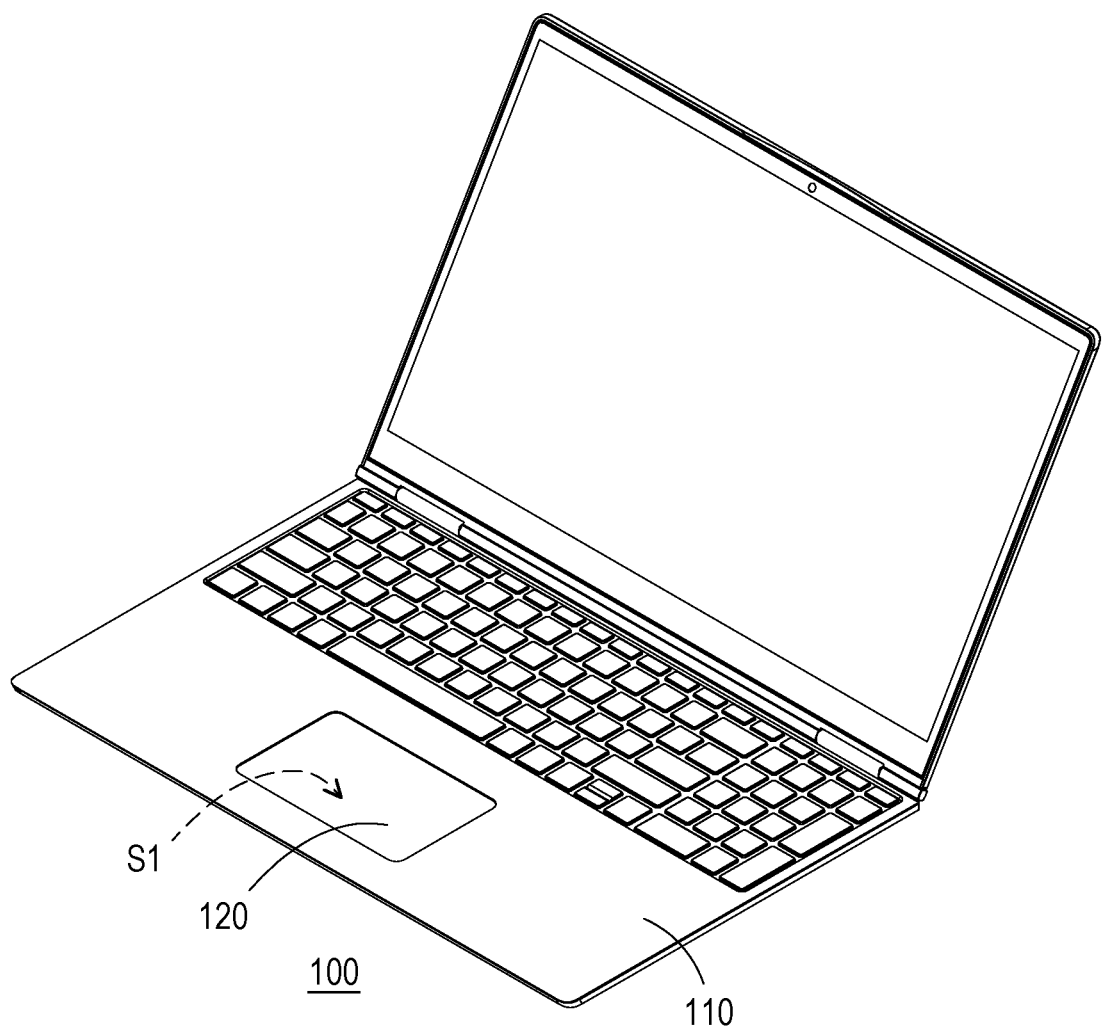
FIG. 1 is a schematic view of a laptop computer according to an embodiment of the disclosure.
Figure 2:
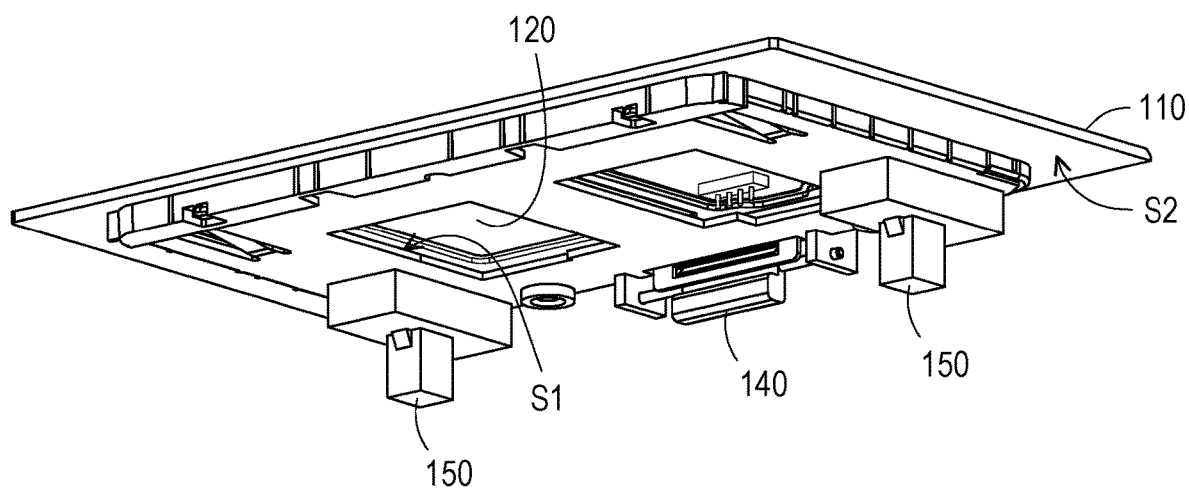
FIG. 2 is a schematic view of some components around a touchpad module of the laptop computer in FIG. 1.
Figure 3:
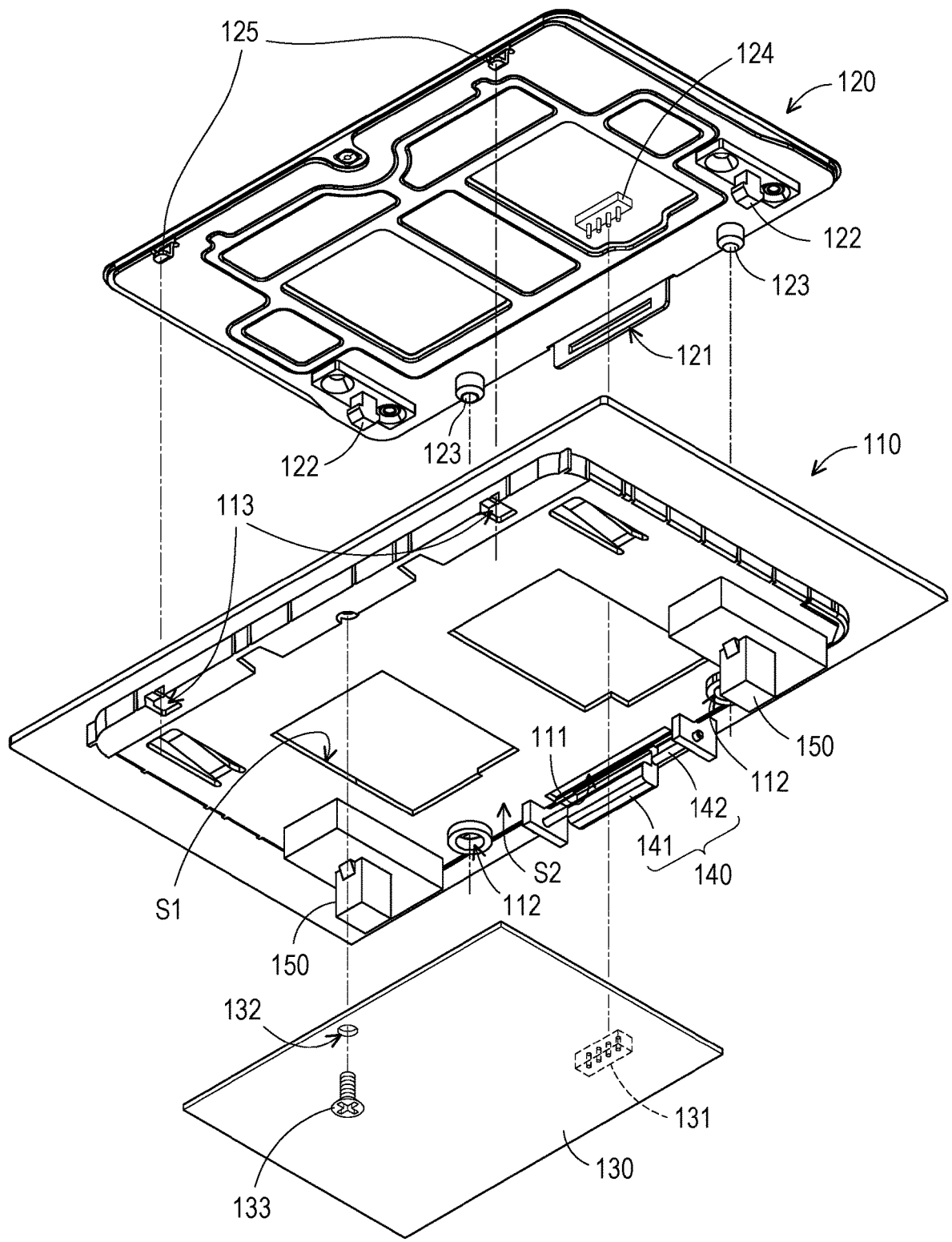
FIG. 3 is an exploded view of a housing and the touchpad module in FIG. 2.

FIG. 1 is a schematic view of a laptop computer according to an embodiment of the disclosure. FIG. 2 is a schematic view of some components around a touchpad module of the laptop computer in FIG. 1. FIG. 3 is an exploded view of a housing and the touchpad module in FIG. 2. Referring to FIG. 1 to FIG. 3, in this embodiment, a laptop computer 100 includes a housing 110, a locking hook 140, and a touchpad module 120. The housing 110 has a first surface S1 and a second surface S2 opposite to each other. The first surface S1 is an external surface of the housing 110, and the second surface S2 is an internal surface of the housing 110. The locking hook 140 is freely pivoted to the housing 110 and located at the second surface S2. The touchpad module 120 has a locking hole 121. The touchpad module 120 is assembled to the first surface S1, and the locking hole 121 penetrates the housing 110 and is protruded out of the second surface S2. The locking hook 140 is locked with the locking hole 121, so that the touchpad module 120 engages with the housing 110.

Figure 4:
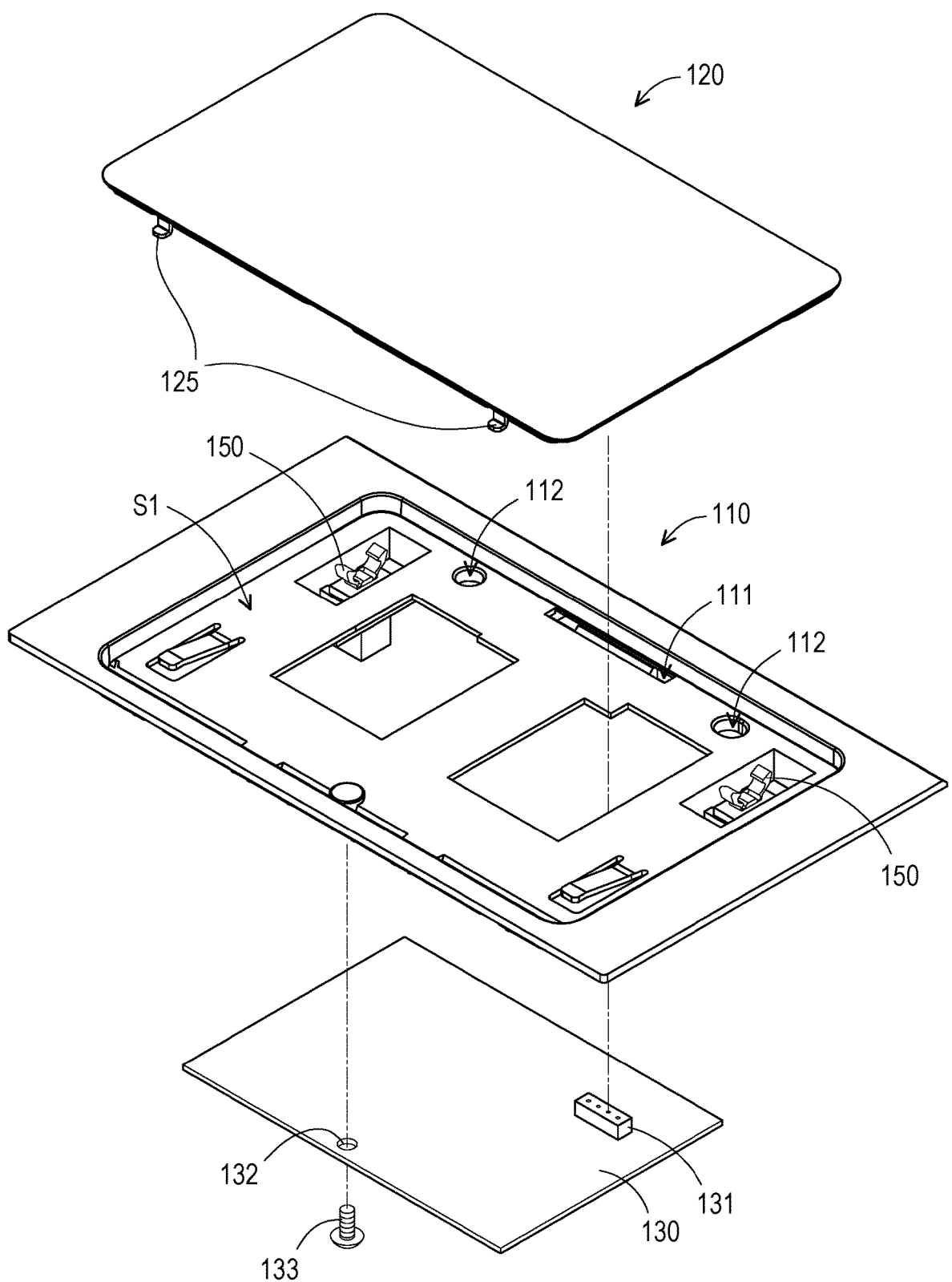
FIG. 4 is an exploded view of FIG. 3 from another angle.

FIG. 4 is an exploded view of FIG. 3 from another angle. Referring to FIG. 3 and FIG. 4, in this embodiment, the touchpad module 120 has a pair of positioning pillars 123, and the housing 110 has a pair of positioning holes 112. The positioning pillars 123 are inserted into the positioning holes 112 respectively. The locking hook 140 is located between the positioning holes 112, and the locking hole 121 is located between the positioning pillars 123. Moreover, the laptop computer 100 includes a pair of pressing grippers 150 set in the housing 110. The touchpad module 120 also has a pair of bidirectional locking hooks 122. The bidirectional locking hooks 122 press the pressing grippers 150 and cause the pressing grippers 150 to grip the bidirectional locking hooks 122 in order to fix the touchpad module 120 to the first surface S1 of the housing 110.

In addition, the laptop computer 100 also includes a circuit board 130, which is, for example, a part of the circuit board in a host system of the laptop computer 100. The circuit board 130 is arranged in the housing 110 and is fastened to the second surface S2 by a screw 133. The touchpad module 120 also has a first electric connector 124, and the circuit board 130 has a second electric connector 131. When the touchpad module 120 is assembled to the first surface S1, the first electric connector 124 penetrates an opening of the housing 110 to be electrically connected to the second electric connector 131, so as to achieve electrical connection between the touchpad module 120 and the host system. In this embodiment, the first electric connector 124 and the second electric connector 131 are pogo pins to be connected to each other in order to achieve electrical connection when assembling the touchpad module 120 to the housing 110.

Furthermore, the touchpad module 120 has a pair of abutting protrusions 125 protruding from an edge of the touchpad module 120, so that when the touchpad module 120 is assembled to the housing 110, the abutting protrusions 125 abut against and are locked in a pair of notches 113 beside the first surface S1.

Figure 5A:
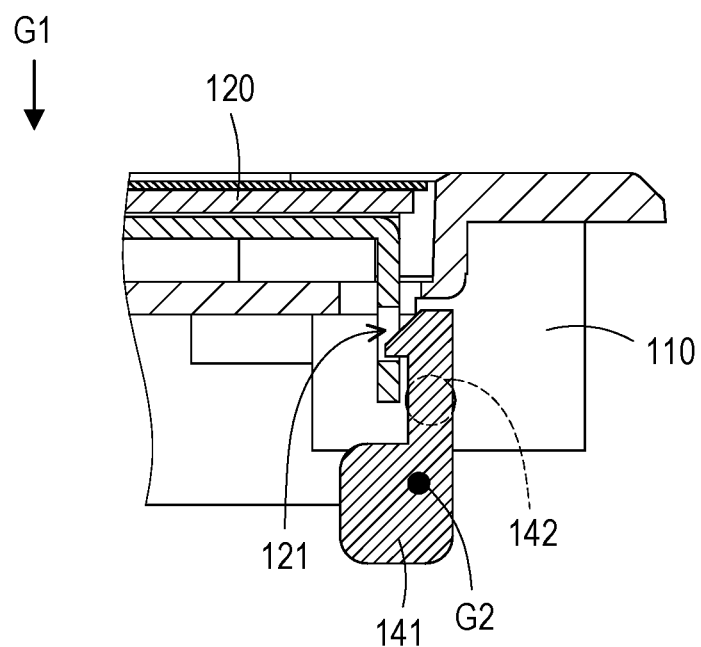
FIG. 5A and FIG. 5B are partial cross-sectional views respectively showing the portion around the touchpad module of the laptop computer.
Figure 5B:
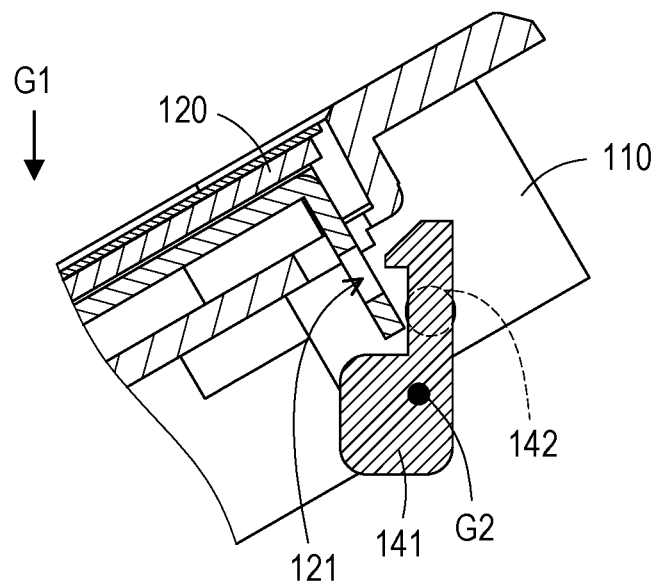

FIG. 5A and FIG. 5B are partial cross-sectional views respectively showing the portion around the touchpad module of the laptop computer. Referring to FIG. 3, FIG. 5A, and FIG. 5B, it is worth noting that the locking hook 140 in this embodiment has a buckle 141 and a pivot 142. The buckle 141 is freely pivoted to the second surface S2 of the housing 110 via the pivot 142. Moreover, in the direction of gravity G1, the center of gravity G2 of the buckle 141 is lower than the pivot 142. Thus, when the housing 110 is placed horizontally (as shown in FIG. 5A), the buckle 141 is locked with the locking hole 121, and when the housing 110 is inclined (as shown in FIG. 5B), the buckle 141 is released from the locking hole 121.

The process of assembling the touchpad module 120 to the housing 110 is described as follows as an example. First, since the abutting protrusions 125 and the locking hole 121 are located on two opposite sides of the touchpad module 120, the user holds and tilts the touchpad module 120 to abut and fit the pair of abutting protrusions 125 into the pair of notches 113 of the housing 110. Next, the user presses the other side of the locking hole 121 to the first surface S1 of the housing 110 to insert the positioning pillars 123 into the positioning holes 112, and at the same time, makes the bidirectional locking hooks 122 press against the pressing grippers 150. Furthermore, the user releases the force required to press toward the housing 110, allowing the pressing grippers 150 to apply reverse force and lock with the bidirectional locking hooks 122. Above all, the center of gravity G2 of the locking hook 140 is arranged to be freely pivoted to the housing 110 as described above. Therefore, when the locking hook 140 is pressed into the housing 110, the structure body that forms the locking hole 121 first pushes the buckle 141 out of the original position, and then the buckle 141 rotates and locks with the locking hole 121 due to the location of the center of gravity G2. Therefore, by buckling the locking hook 140 and the locking hole 121, and the bidirectional locking hooks 122 and the pressing grippers 150, the touchpad module 120 is fixed to the first surface S1 of the housing 110.

By contrast, to remove the touchpad module 120 from the housing 110, the housing 110 is tilted as shown in FIG. 5B for the buckle 141 of the locking hook 140 to move away from the locking hole 121, and then a force is applied to press the position corresponding to the locking hole 121 of the touchpad module 120 to cause the bidirectional locking hooks 122 to press against the pressing grippers 150. Thus, when the force is released, the pressing grippers 150 pushes the bidirectional locking hooks 122 out of the locked position. Consequently, the edge with the locking hole 121 of the touchpad module 120 is successfully lifted from the first surface S1. Then, the user may remove the touchpad module 120 from the first surface S1 of the housing 110 simply by withdrawing the abutting protrusions 125 from the notches 113.

Figure 6A:
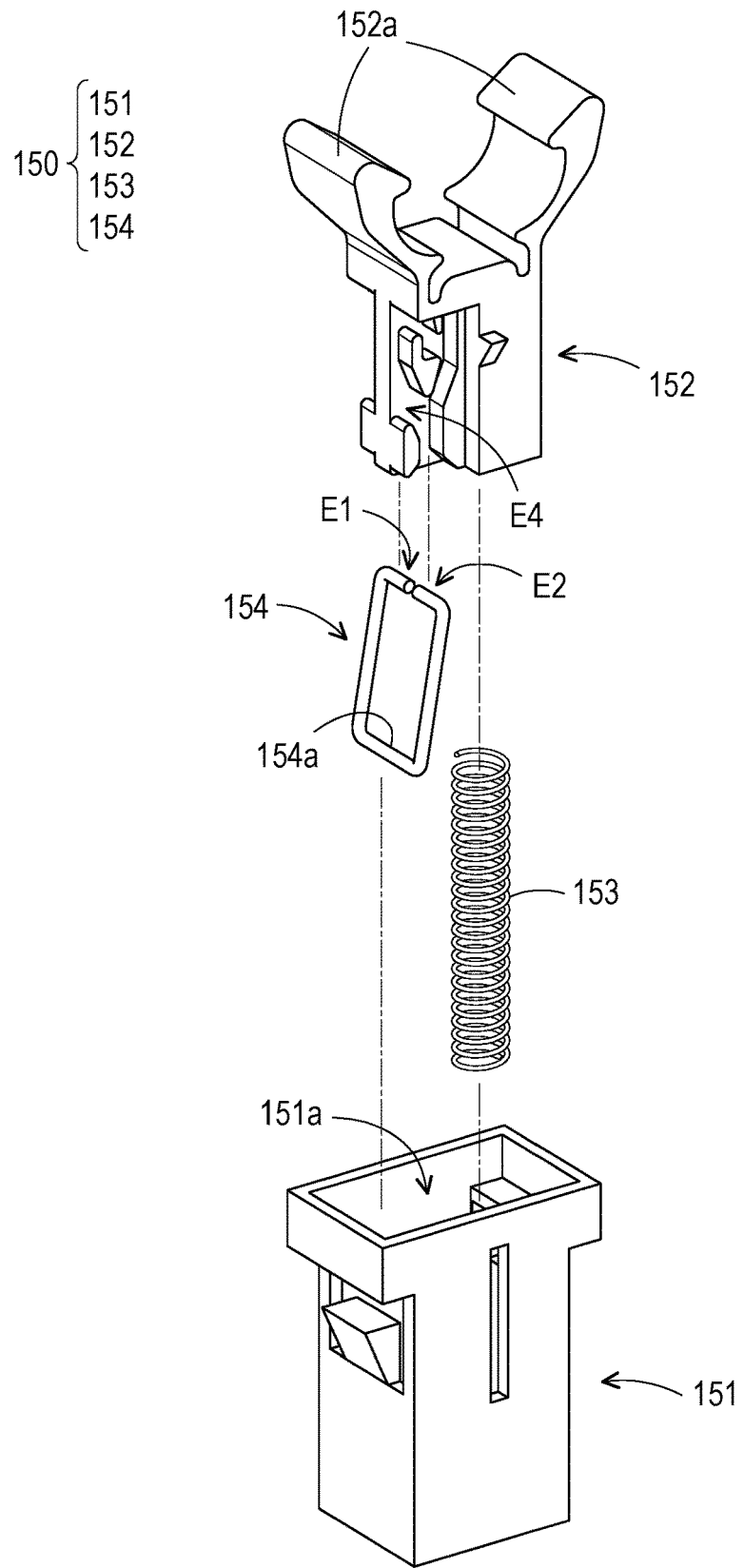
FIG. 6A and FIG. 6B are exploded views respectively showing pressing grippers according to an embodiment of the disclosure.
Figure 6B:
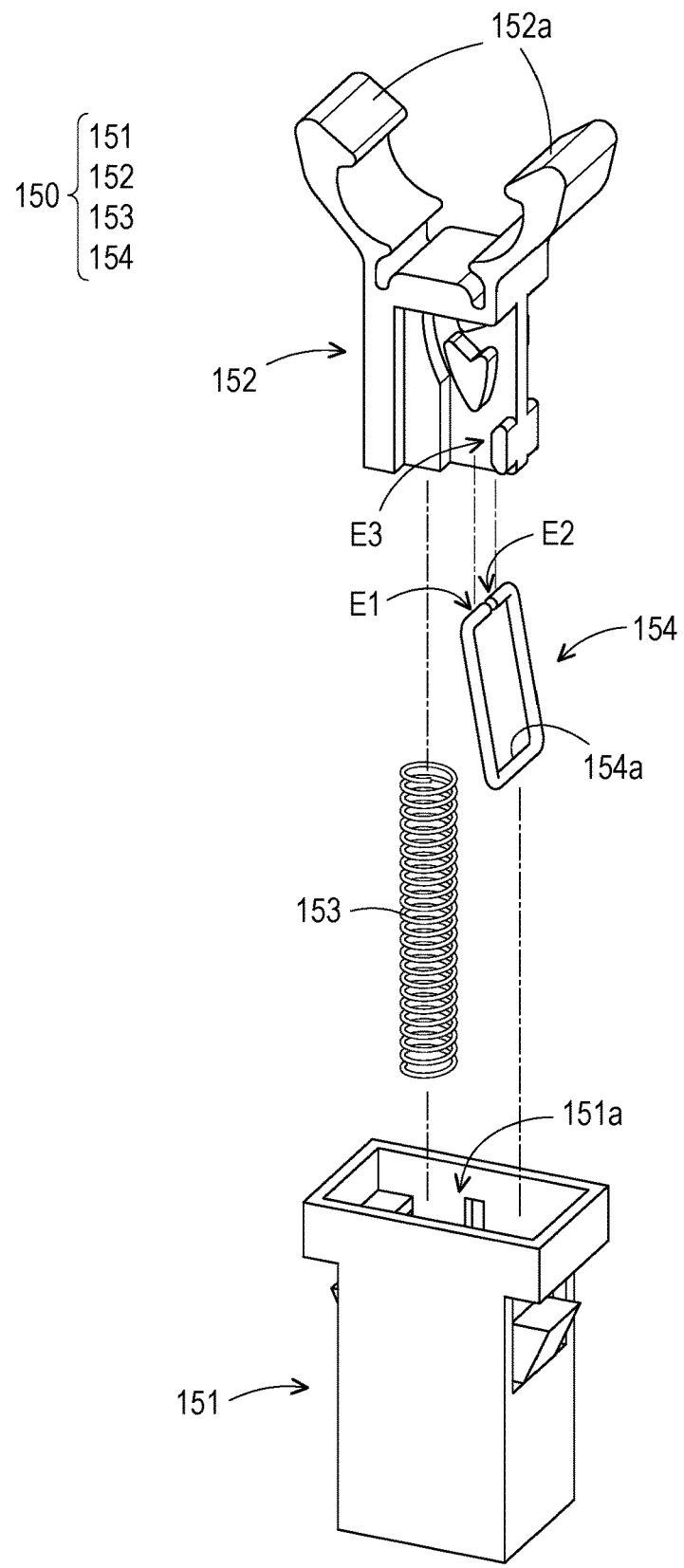
Figure 6C:
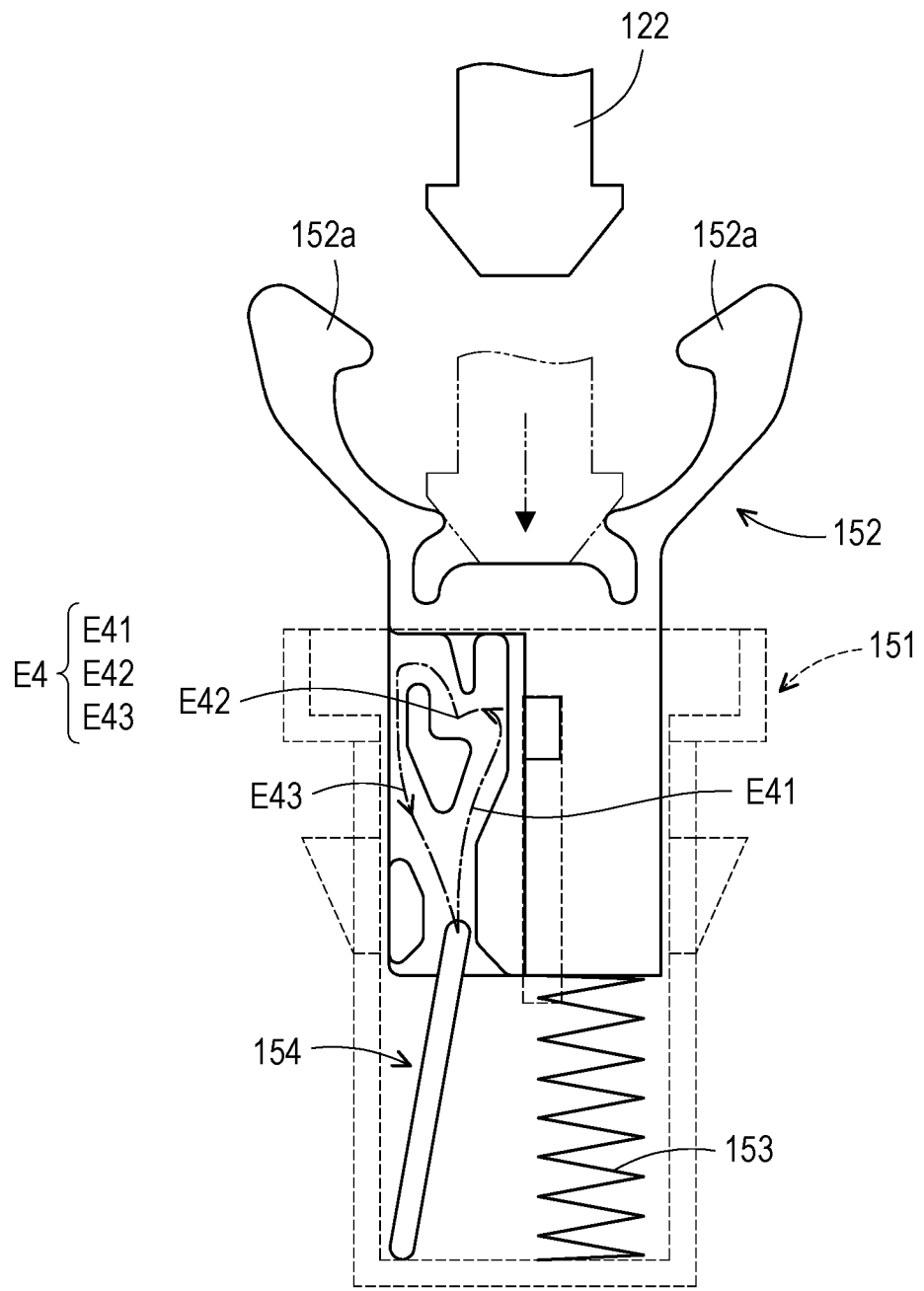
FIG. 6C and FIG. 6D are simple side views before and after the pressing grippers function.
Figure 6D:
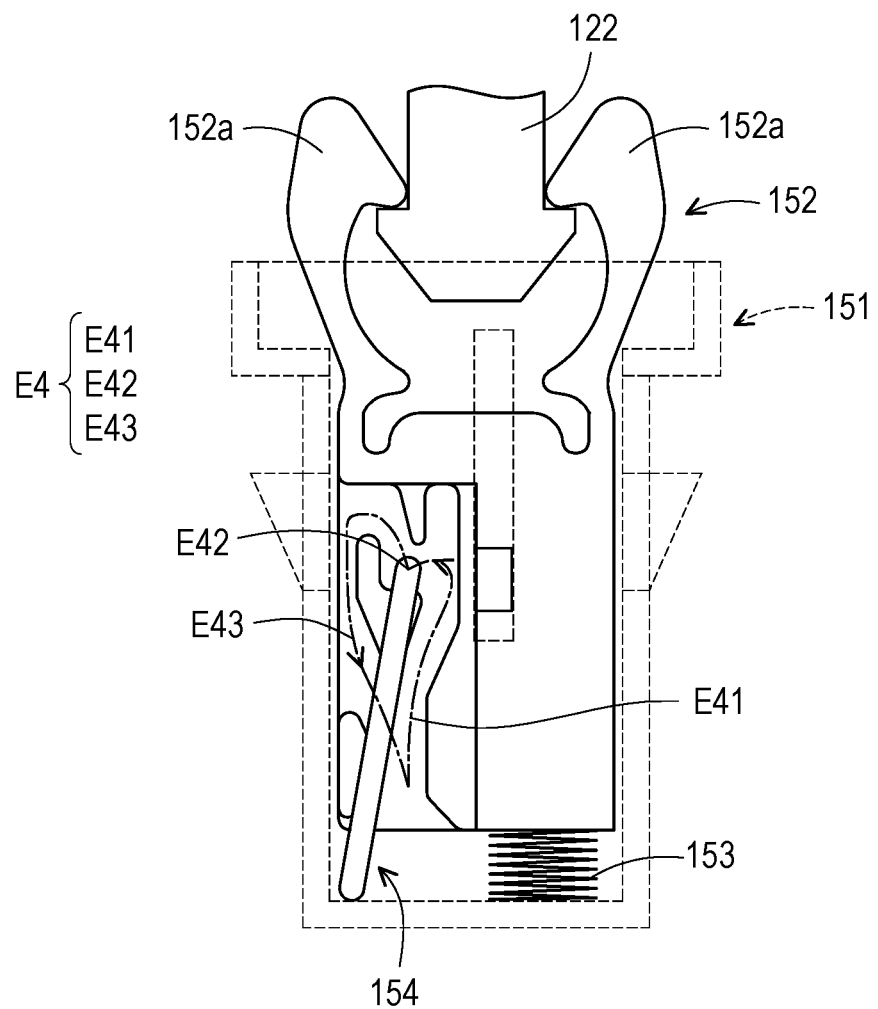

FIG. 6A and FIG. 6B are exploded views respectively showing the pressing grippers according to an embodiment of the disclosure. FIG. 6C and FIG. 6D are simple side views before and after the pressing grippers function. Here, some components are depicted in dotted lines (perspective) in order to help understand the relative movement among the components. Referring to FIG. 6A and FIG. 6B, in this embodiment, each of the pressing grippers 150 includes a base 151, a resilient locking hook 152, a spring 153, and a stay rod 154. The base 151 is arranged in the housing 110 and has a container 151a. The resilient locking hook 152, the spring 153, and the stay rod 154 are movably assembled in the container 151a respectively. The spring 153 abuts between the bottom of the resilient locking hook 152 and the inner bottom of the container 151a. A continuation part 154a of the stay rod 154 leans against the inner bottom of the container 151a while discontinuation parts of the stay rod 154, that is, two ends E1 and E2 of the stay rod 154, are respectively movably coupled to two tracks E3 and E4 of the resilient locking hook 152, so that the movement of the ends E1 and E2 in the tracks E3 and E4 causes the stay rod 154 to pivot.

As stated above, the base 151 is depicted in dotted lines (perspective) here in order to help understand the change in the relationship among the other components in the container 151a. Next, please refer to FIG. 6C and FIG. 6D. As described above, the touchpad module 120 is assembled into the housing 110, the bidirectional locking hooks 122 of the touchpad module 120 first press against the resilient locking hook 152 as indicated by the dotted-line contour of FIG. 6C. Consequently, the resilient locking hook 152 is driven toward the inner bottom of the container 151a to make the locking hook parts 152a elastically deform due to influence of the structure of the container 151a until the bidirectional locking hooks 122 are buckled by the locking hook parts 152a as shown in FIG. 6D. Moreover, as shown in FIG. 6C and FIG. 6D, the ends E1 and E2 of the stay rod 154 move along the tracks E3 and E4. Take the track E4 for example, the track E4 is a circulation loop including a first path E41 and a second path E43 that are connected end to end. FIG. 6D shows that the end E2 of the stay rod 154 temporarily moves to a socket position E42, and at this time, the stay rod 154 interferes with the inner wall structure of the track E4 to prevent the spring 153 from pushing away the resilient locking hook 152, which is the reason why the locking hook parts 152a and the bidirectional locking hooks 122 stay in the buckled state as shown in FIG. 6D.

Next, when releasing, the user again presses the bidirectional locking hooks 122 to move the end E2 of the stay rod 154 along the track E4 again, that is, to move the end E2 of the stay rod 154 along the second path E43 back to the position shown in FIG. 6C. Hereby, the process of buckling is equivalent to the process of the stay rod 154 moving along the first path E41. The releasing process is the restoring process of the stay rod 154 moving along the second path E43.

In conclusion, according to the above embodiment of the disclosure, the housing of the laptop computer has the first surface and the second surface opposite to each other. The first surface is the external surface of the housing, and the second surface is the internal surface of the housing. Moreover, the touchpad module is assembled to the first surface of the housing in a detachable manner. The touchpad module has the locking hole. The locking hole penetrates the housing and is protruded out of the second surface when the touchpad module is assembled to the first surface, so that the locking hole is locked and fixed together with the locking hook arranged at the second surface. In addition, the touchpad module is more firmly combined with and fixed to the housing through cooperation between the bidirectional locking hooks and the pressing grippers arranged in the housing.

As a result, the user is allowed to remove the touchpad module from the first surface easily and conveniently and is not required to take apart the inner components of the housing first as described above. In other words, the touchpad module of the laptop computer is solely removable as the above configuration effectively lifts the restrictions on the relationship of connection and assembly between the touchpad module and the other components.

What is claimed is:

1. A laptop computer with a detachable touchpad module, comprising:
   a housing having a first surface and a second surface opposite to each other, wherein the first surface is an external surface of the housing, and the second surface is an internal surface of the housing;
   a locking hook freely pivoted to the housing and located at the second surface; and
   a touchpad module having a locking hole, wherein the touchpad module is assembled to the first surface, the locking hole penetrates the housing and is protruded out of the second surface, and the locking hook is locked with the locking hole.

2. The laptop computer with the detachable touchpad module according to claim 1, wherein the locking hook comprises a buckle and a pivot, and the buckle is freely pivoted to the second surface of the housing by the pivot.

3. The laptop computer with the detachable touchpad module according to claim 2, wherein in a direction of gravity, a center of gravity of the buckle is lower than the pivot, so that the buckle is locked with the locking hole when the housing is placed horizontally, and the buckle is released from the locking hole when the housing is inclined.

4. The laptop computer with the detachable touchpad module according to claim 1, wherein the touchpad module comprises a pair of positioning pillars, and the housing has a pair of positioning holes, the pair of positioning pillars are inserted into the pair of positioning holes respectively, the locking hook is located between the pair of positioning holes, and the locking hole is located between the pair of positioning pillars.

5. The laptop computer with the detachable touchpad module according to claim 1, further comprising a pair of pressing grippers arranged in the housing, wherein the touchpad module further comprises a pair of bidirectional locking hooks, and the pair of bidirectional locking hooks press the pair of pressing grippers and cause the pair of pressing grippers to grip the pair of bidirectional locking hooks to fix the touchpad module to the first surface.

6. The laptop computer with the detachable touchpad module according to claim 1, further comprising a circuit board arranged in the housing and fastened to the second surface.

7. The laptop computer with the detachable touchpad module according to claim 6, wherein the touchpad module further comprises a first electric connector, the circuit board comprises a second electric connector, and the first electric connector penetrates an opening of the housing to be electrically connected to the second electric connector when the touchpad module is assembled to the first surface.

8. The laptop computer with the detachable touchpad module according to claim 7, wherein the first electric connector and the second electric connector are pogo pins to be connected to each other.

9. The laptop computer with the detachable touchpad module according to claim 1, wherein the touchpad module further comprises a pair of abutting protrusions protruding from an edge of the touchpad module, so that the pair of abutting protrusions abut against and are locked in a pair of notches beside the first surface when the touchpad module is assembled to the housing.

10. The laptop computer with the detachable touchpad module according to claim 9, wherein the pair of abutting protrusions and the locking hole are located on two opposite sides of the touchpad module.

* * * * *